(12) United States Patent
Wang et al.

(10) Patent No.: US 11,900,001 B2
(45) Date of Patent: Feb. 13, 2024

(54) METHOD AND APPARATUS FOR MONITORING PRINT JOBS

(71) Applicant: Zhuhai Pantum Electronics Co., Ltd., Zhuhai (CN)

(72) Inventors: Heng Wang, Zhuhai (CN); Haixiong Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/951,526

(22) Filed: Sep. 23, 2022

(65) Prior Publication Data

US 2023/0088832 A1 Mar. 23, 2023

(30) Foreign Application Priority Data

Sep. 23, 2021 (CN) .......................... 202111116769.6

(51) Int. Cl.
*G06F 3/12* (2006.01)
(52) U.S. Cl.
CPC ............ *G06F 3/126* (2013.01); *G06F 3/1205* (2013.01); *G06F 3/1287* (2013.01)
(58) Field of Classification Search
None
See application file for complete search history.

(56) References Cited

U.S. PATENT DOCUMENTS

| 2005/0162667 | A1* | 7/2005 | Felix | H04N 1/00236 |
| | | | | 358/1.13 |
| 2007/0153313 | A1* | 7/2007 | Han | G06F 3/1274 |
| | | | | 358/1.13 |
| 2010/0220355 | A1* | 9/2010 | Sugiyama | G06F 3/1273 |
| | | | | 358/1.15 |
| 2014/0146343 | A1* | 5/2014 | Matsumura | G06F 3/1238 |
| | | | | 358/1.14 |
| 2015/0268909 | A1* | 9/2015 | Ono | G06F 3/1259 |
| | | | | 358/1.14 |
| 2016/0283170 | A1* | 9/2016 | Gross | G06F 3/1285 |
| 2018/0121147 | A1* | 5/2018 | Nagamatsu | G06F 3/1206 |
| 2021/0149613 | A1* | 5/2021 | Kopparthi | G06F 3/1267 |
| 2023/0088527 | A1* | 3/2023 | Li | G06F 3/1274 |
| | | | | 358/1.14 |

* cited by examiner

*Primary Examiner* — Henok Shiferaw
(74) *Attorney, Agent, or Firm* — ANOVA LAW GROUP PLLC

(57) ABSTRACT

Embodiments of the present disclosure provide a method and an apparatus for monitoring print jobs. The method includes configuring a monitoring program, where the monitoring program monitors queued jobs in a print spooler; and monitoring, by the monitoring program, submission time of all queued jobs; and if queue time of a queued job is determined to be greater than a first preset time, cancelling the queued job according to a preset configuration.

17 Claims, 2 Drawing Sheets

METHOD AND APPARATUS FOR MONITORING PRINT JOBS

CROSS-REFERENCE TO RELATED APPLICATION

This application claims the priority to Chinese patent application No. 202111116769.6, filed on Sep. 23, 2021, in the China National Intellectual Property Administration, the entirety of which is incorporated herein by its reference.

TECHNICAL FIELD

The present disclosure generally relates to the field of image forming technology and, more particularly, relates to a method and an apparatus for monitoring print jobs.

BACKGROUND

A print job sent to an image forming apparatus (such as a printer) may be executed on a computer. For example, after a user clicks a print icon on a document in an application program, the application program sends the print document to a print spooler on the computer; the print document waits for the rendering process of a print driver; and the rendered print document is sent to the image forming apparatus.

In the existing technology, due to limited processing speed of the printer, queued print jobs may frequently be in the print spooler. If the waiting time of the queued print jobs is excessively long or the printer is abnormal which causes the print jobs to be not issued, there is a scenario that the user may not manually cancel the print jobs in the print spooler in time, resulting in that the print jobs may stay in the print spooler for a long time. There may be an application problem: a user A is ready to print a confidential document through a certain printer, but the user A's print job may only be queued in the print spooler first because the printer is printing other jobs at this time. If the printer has been busy printing other jobs, the user A's print job may be delayed, and the user A may leave the printer due to long waiting time. Then, after the user A's print job is printed out after a certain time period, the printed document may be taken away by other users, thereby causing information leakage.

Or there may be another application problem: the user A is ready to print a confidential document through the printer, but the print job may not be printed in time because the printer is in an "abnormal" state (for example, offline, out of paper, paper jam, and the like). Meantime, the user A may not cancel the print job in time. When the printer status is restored later (for example, another user B may reconnect a USB cable with the printer), the user A's print job may be printed out by mistake, resulting in information leakage.

SUMMARY

One aspect of the present disclosure provides a method for monitoring print jobs. The method includes configuring a monitoring program, where the monitoring program monitors queued jobs in a print spooler; and monitoring, by the monitoring program, submission time of all queued jobs; and if queue time of a queued job is determined to be greater than a first preset time, cancelling the queued job according to a preset configuration.

Another aspect of the present disclosure provides an apparatus for monitoring print jobs. The apparatus includes a memory, a processor, and a computer program, where the computer program is stored in the memory and configured to be executed by the processor to implement a method for monitoring print jobs. The method includes configuring a monitoring program, where the monitoring program monitors queued jobs in a print spooler; and monitoring, by the monitoring program, submission time of all queued jobs; and if queue time of a queued job is determined to be greater than a first preset time, cancelling the queued job according to a preset configuration.

Another aspect of the present disclosure provides a non-transitory computer-readable storage medium containing a computer program, where when being executed, the computer program implements a method for monitoring print jobs. The method includes configuring a monitoring program, where the monitoring program monitors queued jobs in a print spooler; and monitoring, by the monitoring program, submission time of all queued jobs; and if queue time of a queued job is determined to be greater than a first preset time, cancelling the queued job according to a preset configuration.

Other aspects of the present disclosure can be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings need to be used for describing various embodiments are described hereinafter. Obviously, the drawings in following description are merely some embodiments of the present disclosure. For those skilled in the art, other drawings may be obtained according to these drawings without creative efforts.

DETAILED DESCRIPTION

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments of the present disclosure, all other embodiments obtained by those skilled in the art without creative work shall fall within the protection scope of the present disclosure.

In embodiments of the present disclosure, the image forming apparatus may be an apparatus having at least one function related to image formation. Above-mentioned functions related to image formation may include, but may not be limited to, a printing function, a scanning function, a copying function, and a facsimile function.

A single-function printer is an image forming apparatus with a printing function only.

A multi-function printer is an image forming apparatus with printing, copying, scanning, and/or faxing functions, where the number of paper trays may be selectively configured.

For a digital compound machine, based on the copying function with standard or optional printing, scanning, faxing functions, file output may be performed by a laser printing manner using digital principle; and images and texts may be edited as needed. The digital compound machine may have a large capacity paper tray, with high memory, large hard disk, strong network support and multitasking parallel processing capability.

Figure 1:
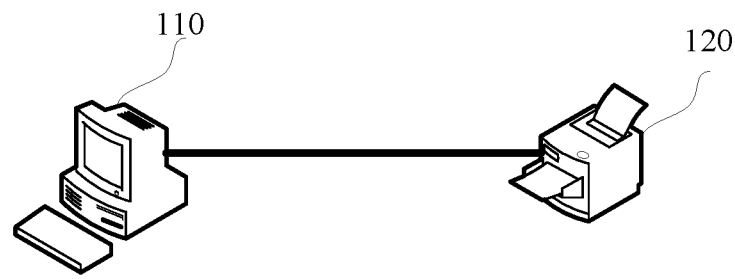
FIG. 1 illustrates a schematic of a system applicable for a method for monitoring print jobs provided by exemplary embodiments of the present disclosure.

Scenarios to which the method for monitoring print jobs provided by embodiments of the present disclosure is applicable are exemplarily illustrated hereinafter. FIG. 1 illustrates a schematic of a system applicable for a method for monitoring print jobs provided by exemplary embodiments of the present disclosure. The system may include a first electronic apparatus 110 and an image forming apparatus 120.

Data communication may be between the first electronic apparatus 110 and the image forming apparatus 120. Above-mentioned image forming apparatus 120 may include, but may not be limited to, following apparatuses, such as a single-function printer, a multi-function printer, a digital composite machine, and the like.

The connection manner between the first electronic apparatus 110 and the image forming apparatus 120 may not be limited in embodiments of the present disclosure. In an optional implementation manner, the first electronic apparatus 110 and the image forming apparatus 120 may be connected through a local area network; in another optional implementation manner, the image forming apparatus 120 may be connected to the first electronic apparatus 110 through a USB cable; and in another optional implementation manner, the image forming apparatus 120 may be connected to the first electronic apparatus 110 through a wireless manner, such as Bluetooth or Wi-Fi Direct.

In embodiments of the present disclosure, the first electronic apparatus 110 may send a print job to the image forming apparatus 120 to perform print output. Normally, the print driver of the image forming apparatus 120 may be installed in the first electronic apparatus 110, so that the application program on the first electronic apparatus 110 may issue print data to the image forming apparatus 120.

Figure 2:
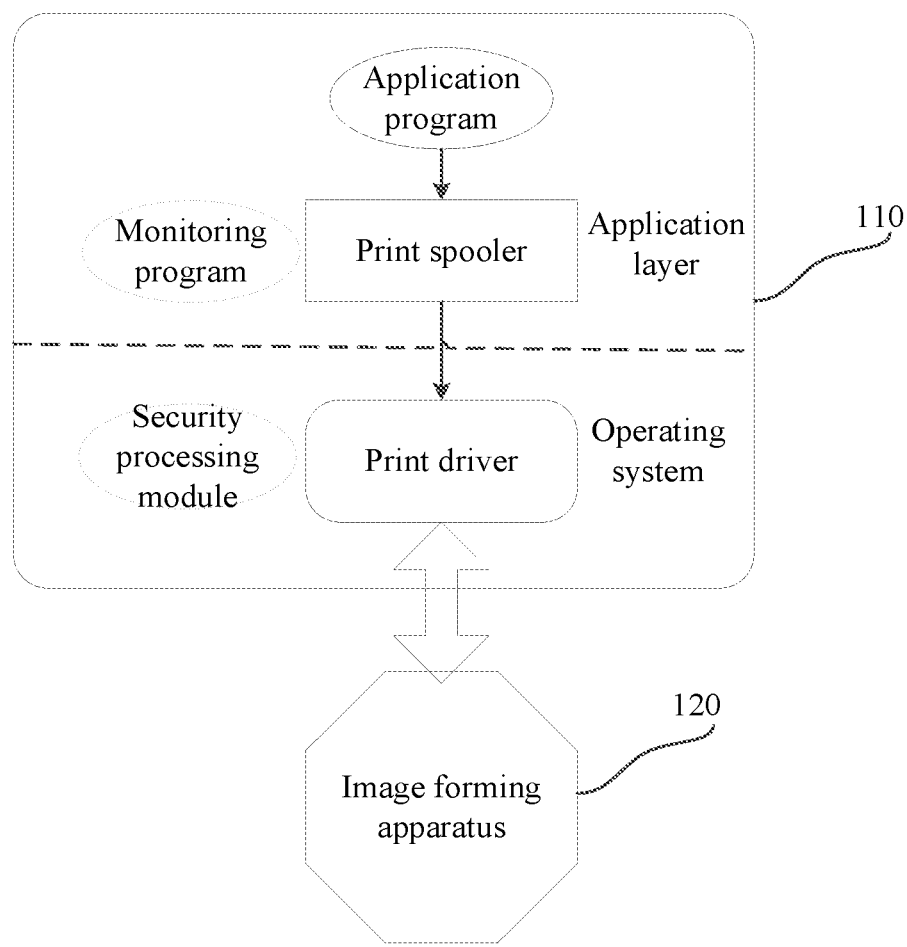
FIG. 2 illustrates a schematic of an operating system and an application layer of a first electronic apparatus provided by exemplary embodiments of the present disclosure.

FIG. 2 illustrates a schematic of an operating system and an application layer of the first electronic apparatus 100 provided by exemplary embodiments of the present disclosure.

As shown in FIG. 2, when a user opens an application such as Word to edit a document and clicks "print" after document editing is completed, the application program of edited document may first send data to be printed to the print spooler provided by the operating system of the first electronic apparatus 110, where the data may be converted to a print job to be printed in the printer spooler, and the user may be enabled to edit print jobs in the print spooler, such as sorting priority and the like; and the print job in the print spooler may be rendered by the print driver; the content of the print job may be converted into print data that can be identified by the image forming apparatus 120 through rendering processing, and such print data may be sent to the image forming apparatus 120. For example, the print jobs in the print spooler may be called queued jobs. The queued jobs may be divided into two print job types, one print job type may include the print jobs issuing data, and the other type may include print jobs that are queued after the print jobs issuing data and wait to be issued. The print driver may receive the print job data from the print spooler and deliver the data to the image forming apparatus 120 while rendering the data.

In addition, there is an application scenario for the transmission process of the print data by the first electronic apparatus 110 in FIG. 1. The first electronic apparatus 110, as a print server or a print cloud server, may forward the print jobs that the client need to print to the image forming apparatus 120, received print jobs may be monitored in the first electronic apparatus, print jobs that has been processed exceeding a preset time may be identified, and the print jobs that has been processed exceeding a preset time may be cancelled, which may prevent the data leakage of the print jobs waiting for a long time.

Optionally, the print driver in FIG. 2 may be, for example, a language monitor module in the print driver that is responsible for issuing print data to the image forming apparatus 120.

Exemplary Embodiment One

Exemplary embodiment one of the present disclosure provides a method for monitoring print jobs, which is suitable for monitoring print jobs in the print spooler. The cancel operation may be generated according to waiting time of the print job, so that the print job with long waiting time may be canceled, and the print job that needs to be canceled may be deleted from the print spooler, which may protect the user's data privacy.

Figure 3:
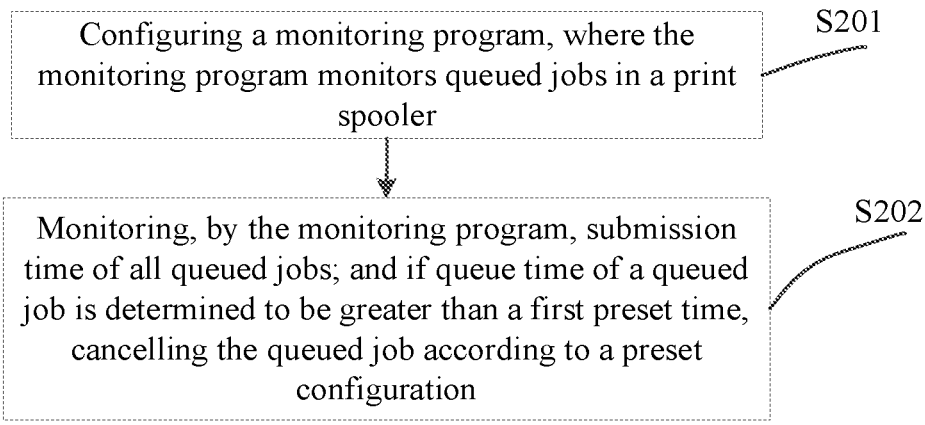
FIG. 3 illustrates a flow chart of a method for monitoring print jobs provided by exemplary embodiment one of the present disclosure.

As shown in FIG. 3, a method for monitoring print jobs may include following exemplary steps.

At S201, a monitoring program may be configured, where the monitoring program may monitor queued jobs in the print spooler.

At S202, the monitoring program may monitor the submission time of all queued jobs and cancel the queued job according to a preset configuration if it determines that the queue time of the queued job is greater than the first preset time.

For example, as shown in FIG. 2, the monitoring program may be added to the operating system of the first electronic apparatus 110, and the monitoring program may be configured to monitor the print jobs in the print spooler.

To keep users informed about the waiting time of queued jobs, the submission time of queued jobs may be displayed in the print spooler.

For example, at S202, the monitoring program may obtain the submission time of the queued job through the system API including GetJob. For example, when the operating system is a domestic system, Linux, or Windows operating system, the monitoring program may obtain the submission time of the queued job through, such as, the system API including GetJob. Above-mentioned preset configuration may include automatically canceling the queued job, so that the queued job may disappear from the print spooler; also include sending a cancellation message to the user and prompting the user to cancel the queued job in the print spooler; and also include popping up a cancellation prompt box and allowing the user to choose whether to cancel overtime print jobs.

In embodiments of the present disclosure, by configuring the monitoring program to monitor the print jobs in the print spooler, when a print job waiting to be printed that has not been printed for a long time is found, the print job may be canceled from the print spooler, without affecting continued printing of subsequent print jobs. Print jobs with long waiting time may occupy queuing resources, if those print jobs are not canceled, subsequent print jobs may continue to wait, which may affect effective use of print resources. Therefore, the present disclosure may not only utilize the printing resources efficiently, but also protect the data security of the user and prevent the private information of the print jobs from being leaked due to long time waiting.

Optionally, the monitoring program may include a first security storage unit. When determining that the queue time of the queued job is greater than the first preset time, the first security storage unit may perform backup and storage of a part or all of the data of the queued job. In embodiments of the present disclosure, when the monitoring program cancels overtime queued jobs in the print spooler, the print jobs may be further backed up. In such way, the user may be allowed to subsequently enter the monitoring program to view canceled print jobs, and canceled print jobs may also be resumed in the first security storage unit. Furthermore, the access restriction of the first security storage unit may be configured, and only authorized users may access the first security storage unit.

Furthermore, when the first security storage unit backs up and stores the queued job with data being issued in the print spooler, the method may further include that the monitoring program may obtain the processing information of the queued job with data being issued from the print driver and perform backup and storage of a part or all of the data of the queued job with data being issued according to the processing information.

In embodiments of the present disclosure, the user may be allowed to choose whether to back up all or a part of the data when backing up the print job with data being issued to the image forming apparatus 120. For example, when the print job with data being issued in the print spooler has ten pages of data, after the seventh page of data is issued, the image forming apparatus 120 may not continue to receive data (for example, due to full memory, offline and the like), such that the print job with data being issued in the print spooler may suspend data issuing. At this point, the print driver may not render and issue the last three pages of data. When the application program determines that the print job with data being issued exceeds a certain duration, the application program may obtain the processing information of the print job (such as the number of pages that have been issued) from the print driver and prompt the user to choose whether remaining three pages of data or all data may be saved. If the user selects remaining three pages of data, remaining three pages of data that have not been issued may be stored in the first security storage unit. Therefore, when the user needs to resume printing, the user may obtain remaining three pages of data from the first security storage unit and continue to print remaining three pages of data, instead of reprinting all ten pages of data because previous seven pages of data have already been outputted by the image forming apparatus 120. Therefore, the user may further resume the printing operation conveniently, and print paper may also be saved.

Furthermore, the user may resume printing the queued jobs backed up in the first security storage unit. In embodiments of the present disclosure, the print jobs processed exceeding a preset time may be canceled from the print spooler, and the canceled print jobs may also be backed up in a strongbox, which may be convenient for the user to query and/or resume the print operation later. In such way, not only secure and confidential processing may be performed on the print jobs, but also users may be given the flexibility to resume print jobs.

The monitoring program in embodiments of the present disclosure may be an additionally installed application program or an integral part of the print driver program.

Above descriptions are all based on the scenario where the first electronic apparatus, as a client (for example, a personal computer or a mobile phone) sending the print jobs, may directly send the print jobs to the image forming apparatus 120.

The monitoring method in embodiments of the present disclosure may also be applicable to monitoring queued print jobs in a print server or a cloud server, identify the print job whose waiting time is equal to or greater than the first preset time in queued print jobs through the monitoring program, and cancel the overtime print job according to the preset configuration. Therefore, above-mentioned print spooler may not only be a print spooler for caching queued jobs in the operating system of the client, but also a print spooler for caching queued print jobs in a print server or a cloud server. The print spooler may not be limited to its definition, as long as the print spooler is a cache tool or a cache program that caches print jobs waiting to be transmitted to the image forming apparatus 120, which may be within the scope of the print spooler of the present disclosure.

A specific program may be in the print server to cache received print jobs and coordinate forwarding of print jobs. Therefore, the monitoring program in embodiments of the present disclosure may integrate such specific program or be used as an application program alone.

Exemplary Embodiment Two

The print jobs in the print spooler may be monitored. The print jobs in the print spooler may be divided into two parts, one part may be the print jobs that are queued to be issued, and the other part may be the print jobs that are issuing data. For the data of the print jobs that are issuing data, a part of the data may have been rendered by installed print driver and issued to the image forming apparatus 120, but some data may still be waiting for the rendering processing of the print driver. If the USB of the image forming apparatus 120 is disconnected or a paper jam occurs at this time which may result in that printing cannot be continued, such that a part of the data in the print jobs that are issuing data may not continue to be printed out. When the image forming apparatus 120 resumes normal operation, remaining print data may be continued to be sent to the image forming apparatus 120 for continuous print output, and there may be a problem that the user may have forgotten the print jobs, resulting in that printed paper document may leak data.

In order to solve above-mentioned problem, embodiments of the present disclosure provide a monitoring method. The method may include that above-mentioned monitoring program may be configured to separately monitor the queued jobs to be issued in the print spooler; and the monitoring method of embodiments of the present disclosure may further include configuring a security processing module, where the security processing module may monitor whether a queued job with corresponding data being issued is abnormal.

The security processing module monitoring whether the queued job with corresponding data being issued is abnormal may include determining whether the processing time of the queued job with corresponding data being issued exceeds a second preset time; and if the processing time exceeds the second preset time, determining that the queued job is processed abnormally and removing the queued job from the print spooler. For example, the security processing module may obtain the submission time of the queued job with corresponding data being issued and compare the submission time with current time; and find that when the time difference between the submission time of the queued job with corresponding data being issued and current time is equal to or greater than the second preset time, it may indicate that the print job with corresponding data being issued has been processed exceeding a preset time. Or the security processing module may compare receiving time of the print job that receives and issues data with current time; and find that when the time difference is equal to or greater than the second preset time, it may indicate that the print job with corresponding data being issued has been processed exceeding a preset time; or when it is found that the print job with corresponding data being issued is stopped due to reasons such as the image forming apparatus cannot receive the print job, and calculated stop time reaches the second preset time, it may indicate that the print job with corresponding data being issued has been processed exceeding a preset time. The security processing module may be a cyclic program that performs a "monitoring" operation at regular intervals (for example, 30 seconds), for example, comparing the submission time of the queued job with corresponding data being issued with current time, or comparing the receiving time of the print job receiving the issued data with current time, or calculating the stop time.

For example, as shown in FIG. 2, the security processing module may be added to the operating system of the electronic apparatus 110, and the security processing module may be configured to monitor whether the print job with corresponding data being issued is processed exceeding a preset time.

In embodiments of the present disclosure, the security processing module may be configured. The security processing module may belong to a part of the print driver and effectively cancel paused print job with corresponding data being issued in the print spooler, which may prevent remaining unprinted print data from leaking out. Optionally, the security processing module may be an integral part of the language monitor module in the print driver.

For example, the process of canceling the print job by the security processing module may include that the security processing module may include a second security storage unit, where the second security storage unit may be configured to back up and store a part or all of the data of the queued job with corresponding data being issued. The print job with corresponding data being issued in the print spooler may be removed from the print spooler because all data is transferred to the print driver. Optionally, the security processing module may delete temporary data corresponding to the background of the print driver, and clear temporary data generated by canceled print job, thereby ensuring data security.

The difference between one embodiment and above-mentioned embodiments is that, in exemplary embodiment one, only the monitoring program may be configured to monitor the queued jobs in the print spooler, and the monitoring program may cancel the queuing of the print jobs that are issuing data, and further backup and store all data of canceled print jobs. The monitoring program may not know which part of the data has been issued by the print job with corresponding data being issued, such that after the monitoring program obtains the processing information from the print driver, the monitoring program may choose to backup and store a part of the data of the print job with corresponding data being issued, allowing the user to resume printing from the number of pages stopped to avoid reprinting the content that has been printed before. In one embodiment, the monitoring program and the security processing module may be configured. The monitoring program may specifically monitor the queued jobs to be issued and cancel found overtime queued jobs. The security processing module may perform overtime monitoring of queued job with corresponding data being issued. If it is found that the queued job with corresponding data being issued has not been issued successfully within a certain duration, the cancel operation may be configured. The cancel operation may be to continue receiving and backing up remaining data of the queued job with corresponding data being issued, so that the queued job disappears from the print spooler, or it can be received and then deleted. For those jobs that cannot continue to be printed due to the failure of the image forming apparatus, the remaining data content can be completely deleted to protect the security of the data from being leaked.

In order to further ensure the security of canceling the print job, the first preset time and/or the second preset time may be configured in the monitoring program or the security processing module, so that the user may manually set the time for canceling the print job. When the user sets the time, it indicates that when the monitoring program or the security processing module finds that the waiting time of the print job in the print spooler reaches the time configured by the user, the print job may be canceled according to the preset configuration. Optionally, the first preset time or the second preset time may be configured by an administrator, and the first preset time or the second preset time may be configured only after the administrator logs into in the monitoring program or the security processing module. Optionally, the duration of the first preset time or the second preset time may be configured by logging into the management web page of the image forming apparatus. Optionally, the first preset time or the second preset time may be configured only after the administrator logs into the management web page. Optionally, the user may also configure that when the waiting time of the print job reaches a third preset time, a reminder message may be sent to the user through the monitoring program or an email to prompt the user whether the print job is canceled or continue to wait printing. If the user chooses to cancel the print job in the reminder message, cancellation processing may be performed on waiting print job. Such reminder information may be convenient for the user to know the processing progress of the job.

Meanwhile, the first preset time or the second preset time may be configured through the administrator's login, and ordinary users may not configure the first preset time or the second preset time by themselves, which may further ensure security management of the print jobs in the print spooler.

Similarly, embodiments of the present disclosure are also applicable to an application scenario of the print server. In the print server, the monitoring program may monitor queued print jobs and cancel print jobs that are processed exceeding a preset time. Optionally, canceled print jobs may also be backed up and stored in the print server, and the user may be notified, so that the user may resume printing operation.

Similarly, the monitoring program in the print server may not only monitor the waiting time of queued jobs to be issued, but also monitor specific information of queued jobs that are currently issuing data, for example, may obtain the number of pages which has been issued, certain reason of the printer which causes stop of issuing data, and the like.

According to monitoring the stop time of the queued job with corresponding data being issued, it may determine that the queued job with corresponding data being issued needs to be canceled due to overtime.

Optionally, in one embodiment, the print driver in the print server or the client may include the function of the security processing module and execute that the print job which is processed exceeding a preset time may be identified when the print job is rendered, such that the print job may be cancelled to ensure that the print data is secure to be not leaked.

Exemplary Embodiment Three

Figure 4:
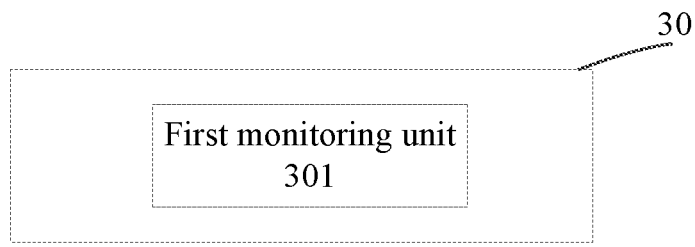
FIG. 4 illustrates a module component schematic of an apparatus for monitoring print jobs provided by exemplary embodiment three of the present disclosure.

Exemplary embodiment four of the present disclosure provides a monitoring apparatus for print jobs. As shown in FIG. 4, the monitoring apparatus 30 may include a first monitoring unit 301, where the first monitoring unit 301 may monitor queued jobs in the print spooler.

The first monitoring unit 301 may monitor the submission time of all queued jobs, and if it determines that the queued time of a queued job is greater than the first preset time, the queued job may be canceled according to the preset configuration.

The monitoring apparatus provided by embodiments of the present disclosure may monitor the print jobs in the print spooler, and automatically cancel delayed jobs that have not been printed for a long time, which may improve maintenance printing efficiency and ensure that the print jobs are secure and confidential to be not leaked.

For example, the submission time of the queued job may be displayed in the print spooler, which may be more convenient for the user to check the submission time of the job, so that the user may know the waiting time of the print job and may be facilitated to perform further maintenance on waiting print job such as manually canceling or executing printing.

For example, when the operating system is a domestic system, Linux, or Windows operating system, the monitoring program may obtain the submission time of the queued job from, such as, the system API including GetJob.

Above-mentioned preset configuration may include automatically canceling the queued job, so that the queued job may be removed from the print spooler; further include sending a cancellation message to the user and prompting the user to cancel the queued job in the print spooler; and further include popping up a cancellation prompt box, allowing the user to choose whether overtime print job is canceled.

Optionally, the first monitoring unit 301 may include the first security storage unit. When it determines that the queuing time of the queued job is greater than the first preset time, the first security storage unit may back up and store of a part or all of the data of the queued job. In embodiments of the present disclosure, when the first monitoring unit 301 cancels overtime queued job in the print spooler, the first monitoring unit 301 may further back up the print job, so that the user may resume canceled print job later. Furthermore, the access restriction of the first security storage unit may be configured, and only authorized users may access the first security storage unit.

Furthermore, the first security storage unit backs up and stores the queued job with corresponding data being issued in the print spooler, which may include that the first monitoring unit 301 may obtain processing information of the queued job with corresponding data being issued from the print driver and backup and store a part or all of the data of the queued job with corresponding data being issued according to the processing information. Therefore, it may be convenient for the user to resume the printing operation, and a part of the data that has not been printed for the queued job with corresponding data being issued may continue to be printed out, which may save print paper.

The part of exemplary embodiment three of the present disclosure that is same as above-mentioned embodiments may not be described in detail herein.

Exemplary Embodiment Four

Figure 5:
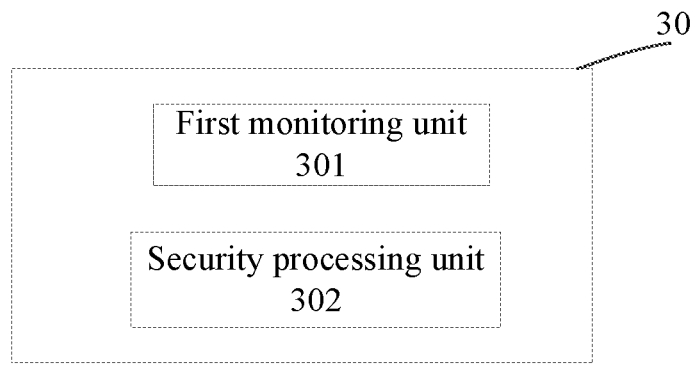
FIG. 5 illustrates a module component schematic of an apparatus for monitoring print jobs provided by exemplary embodiment four of the present disclosure.

In order to further improve maintenance efficiency and cancel the print job that has already been issued in the print spooler after being stopped due to the problem with the image forming apparatus, on the basis of exemplary embodiment three, the monitoring apparatus 30 in one embodiment of the present disclosure may further include a security processing unit 302 as shown in FIG. 5. The security processing unit 302 may monitor whether the queued job with corresponding data being issued is abnormal.

In one embodiment, the first monitoring unit 301 may be configured to monitor queued jobs to be issued, and the security processing unit 302 may be configured to monitor the queued jobs that are issuing data.

The security processing unit 302 monitoring whether the queued job with corresponding data being issued is abnormal may include determining whether the processing time of the queued job with corresponding data being issued exceeds the second preset time, and if the time exceeds the second preset time, determining that the queued job is processed abnormally and removing the queued job from the print spooler. For example, the security processing unit 302 may obtain the submission time of the queued job with corresponding data being issued and compare the submission time with current time, and find that when the time difference between the submission time of the queued job with corresponding data being issued and current time is equal to or greater than the second preset time, it may indicate that the print job with corresponding data being issued has been processed exceeding a preset time. The process for the security processing unit 302 to remove the queued job from the print spooler may include that the security processing unit 302 may include the second security storage unit, where the second security storage unit may be configured to perform backup and storage on a part or all of the data of the queued job with corresponding data being issued. The print job with corresponding data being issued in the print spooler may be removed because all data is transferred to the security processing unit.

In embodiments of the present disclosure, the security processing unit may be configured to monitor the print job with corresponding data being issued, which may effectively continue to receive a part of the data content of the print job delayed in the print spooler, so that the print job may be removed from the print spooler, thereby protecting user's private data.

The monitoring apparatus in embodiments of the present disclosure may be a hardware computer, and the hardware computer may run a monitoring program to monitor the print job of the image forming apparatus.

In addition, the monitoring apparatus of embodiments of the present disclosure may be a virtual apparatus, such as a monitoring application program that may be installed in a hardware computer; and the monitoring application program may be executed to implement monitoring and maintenance of the image forming apparatus and/or the print spooler.

The part of exemplary embodiment four of the present disclosure that is same as above-mentioned embodiments may not be described in detail herein.

Exemplary Embodiment Five

All of above-mentioned embodiments may monitor the print jobs that are not sent to the image forming apparatus or the print jobs that are being sent to the image forming apparatus. Embodiments of the present disclosure provides a monitoring method, which is applicable for monitoring the print jobs waiting to be printed in the image forming apparatus body through a print driver and allowing the image forming apparatus to cancel the print jobs waiting over a certain duration.

For example, the monitoring method may include that the print job information, such as the submission time, queuing time, waiting time and the like of print jobs, of the print task waiting to be printed may be obtained from the image forming apparatus; if obtained print job information indicates that waiting time for printing of the print task exceeds a preset time, the image forming apparatus may be instructed to cancel the print task. The print jobs included in the print task may be deleted in the image forming apparatus; and overtime processing print job may be received again from the image forming apparatus and stored in the second security storage unit, so that the user may resume the printing operation.

Therefore, in one embodiment, the client or the print server may monitor the print job that has been processed exceeding a preset time in the image forming apparatus body and perform the cancellation operation on the print job. The print spooler described in above embodiments may also be a print spooler that caches multiple print tasks in the image forming apparatus or may also be a print queue in the image forming apparatus main body. For the print tasks to be printed in the print queue, the client or print server may perform overtime monitoring, identify the print tasks that cannot be processed for a long time, and allow the image forming apparatus to perform cancellation processing on the print tasks; the print jobs of the print task may be deleted or the client or server may back up canceled print jobs; furthermore, canceled print jobs may be backed up and stored in the image forming apparatus main body, so that the user may access canceled print job by being authorized and resume printing.

Through various embodiments of the present disclosure, the print jobs processed exceeding a preset time may be monitored from the client side, the server side and the printer side, thereby comprehensively ensuring the security protection of the print jobs and preventing unnecessary data leakage.

Optionally, embodiments of the present disclosure also be applied to that the print driver or monitoring program on the client may monitor queued print jobs to be issued in the print server or cloud server, identify and cancel the print jobs processed exceeding a preset time. For example, the print driver or monitoring program of the client may obtain information such as the submission time, queuing time, waiting time, and other information of the print job waiting to be issued from the print server or the cloud server; and if obtained print job information indicates that waiting print time of the print job exceeds a preset time, the print server or the cloud server may be instructed to cancel the print job.

In addition, embodiments of the present disclosure further provide an electronic apparatus, including a memory, a processor, and a computer program.

The computer program may be stored in the memory and configured to be executed by the processor to implement the monitoring method described above.

Furthermore, embodiments of the present disclosure also provide a computer-readable storage medium, where a computer program may be stored, and when the program is executed, above-mentioned monitoring method may be implemented.

From above-mentioned embodiments, it may be seen that the solutions provided by the present disclosure may achieve at least following beneficial effects.

According to embodiments of the present disclosure, the print job may be monitored in real time on the printer side, which may prevent information leakage due to the print job may have been processed exceeding a preset duration and effectively improve security performance of the print operation.

Above descriptions are only preferred embodiments of the present disclosure and are not intended to limit the present disclosure. Any modification, equivalent replacement, improvement and the like made within the spirit and principle of the present disclosure shall be included within the protection scope of the present disclosure.

What is claimed is:

1. A method for monitoring print jobs, comprising:
monitoring queued jobs in a print spooler;
monitoring submission time of queued jobs, in response to that a queue time of a queued job of the queued jobs is greater than a first preset time, cancelling the queued job; and
determining whether a processing time of the queued job which has been delivered to an image forming apparatus from the queued jobs exceeds a second preset time, in response to that the processing time exceeds the second preset time, determining the queued job which has been delivered to the image forming apparatus is processed abnormally, and removing the queued job which has been delivered to the image forming apparatus from the print spooler.

2. The method according to claim 1, further comprising:
displaying the submission time of the queued job in the print spooler.

3. The method according to claim 1, further comprising:
obtaining the submission time of the queued job through a system API.

4. The method according to claim 1, further comprising:
in response to that the queue time of the queued job is greater than the first preset time, performing backup and storage on a part or all of data of the queued job in the print spooler.

5. The method according to claim 4, further comprising:
obtaining processing information of the queued job which has been delivered to the image forming apparatus from a print driver; and
performing the backup and storage on the part or all of the data of the queued job which has been delivered to the image forming apparatus according to the processing information.

6. The method according to claim 4, further comprising:
resuming printing the queued job as backed up.

7. The method according to claim 1, further comprising:
sending a cancellation message to a user terminal to prompt the user terminal to cancel the queued job in the print spooler.

8. The method according to claim 1, further comprising:
Popping up a cancellation prompt box to allow a user terminal to choose whether to cancel the queued job.

9. The method according to claim 1, further comprising:
obtaining information on first number of pages that have been issued; and
prompting a user terminal to choose whether remaining number of pages are to be saved.

10. The method according to claim 1, further comprising:
presenting a management web page for configuration of the first preset time or the second preset time.

11. An apparatus for monitoring print jobs, comprising: a memory, a processor, and a computer program, wherein the computer program is stored in the memory and configured to be executed by the processor to implement a method for monitoring print jobs, the method comprising:
monitoring queued jobs in a print spooler;
monitoring submission time of queued jobs, in response to that a queue time of a queued job of the queued jobs is greater than a first preset time, cancelling the queued job; and
determining whether a processing time of the queued job which has been delivered to an image forming apparatus from the queued jobs exceeds a second preset time, in response to that the processing time exceeds the second preset time, determining the queued job which has been delivered to the image forming apparatus is processed abnormally, and removing the queued job which has been delivered to the image forming apparatus from the print spooler.

12. The apparatus according to claim 11, the method further comprising:
displaying the submission time of the queued job in the print spooler.

13. The apparatus according to claim 11, the method further comprising:
obtaining the submission time of the queued job through a system API.

14. The apparatus according to claim 11, the method further comprising:
in response to that the queue time of the queued job is greater than the first preset time, performing backup and storage on a part or all of data of the queued job in the print spooler.

15. The apparatus according to claim 14, the method further comprising:
obtaining processing information of the queued job which has been delivered to the image forming apparatus from a print driver; and
performing the backup and storage on the part or all of the data of the queued job which has been delivered to the image forming apparatus according to the processing information.

16. The apparatus according to claim 14, the method further comprising:
resuming printing the queued job as backed up.

17. A non-transitory computer-readable storage medium containing a computer program, wherein when being executed, the computer program implements a method for monitoring print jobs, the method comprising:
monitoring queued jobs in a print spooler;
monitoring submission time of queued job, in response to that a queue time of a queued job of the queued jobs is greater than a first preset time, cancelling the queued job; and
determining whether a processing time of the queued job which has been delivered to an image forming apparatus from the queued jobs exceeds a second preset time, in response to that the processing time exceeds the second preset time, determining the queued job which has been delivered to the image forming apparatus is processed abnormally, and removing the queued job which has been delivered to the image forming apparatus from the print spooler.

* * * * *